C. ALDEN.
Evaporating Pan.
No. 25,614. Patented Oct. 4, 1859.
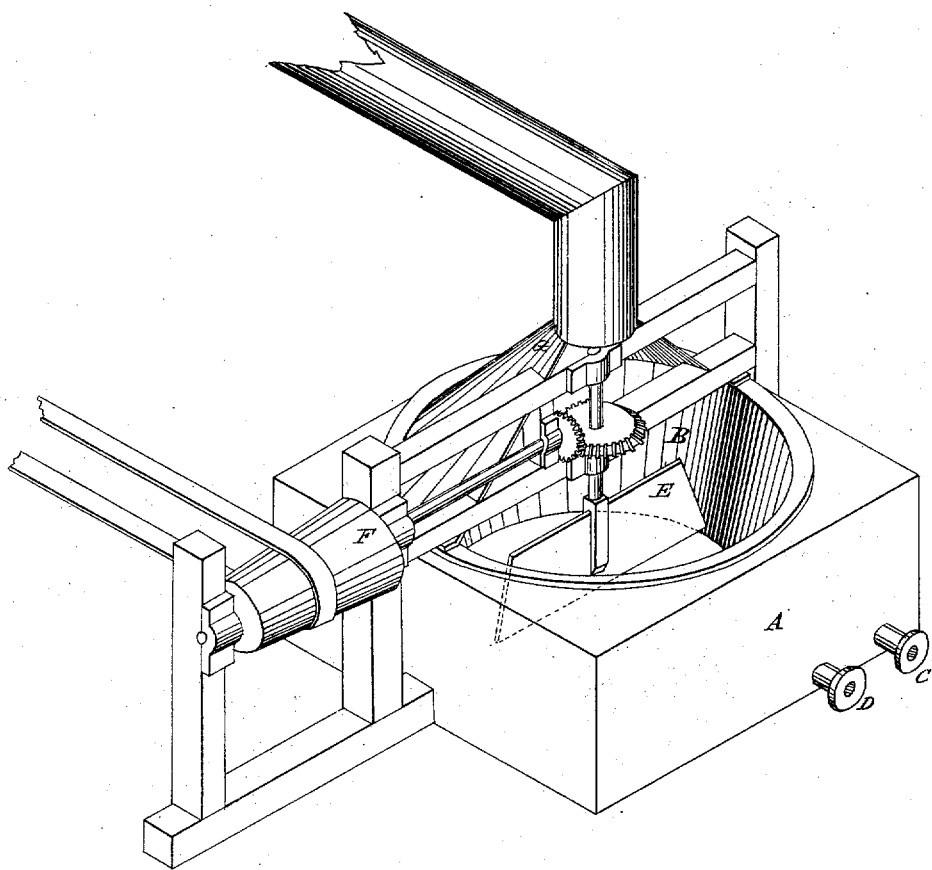
Witnesses:
J. P. Pinson
S. H. Maynard
Inventor:
Charles Alden

UNITED STATES PATENT OFFICE.

CHARLES ALDEN, OF NEW YORK, N. Y.

IMPROVEMENT IN APPARATUS FOR EVAPORATION.

Specification forming part of Letters Patent No. 25,614, dated October 4, 1859.

*To all whom it may concern:*

Be it known that I, CHARLES ALDEN, of New York, county of New York, and State of New York, have invented certain new and useful Improvements in Evaporators and Desiccators; and I do hereby declare that the following is a full, clear, and exact description of the same, reference being made to the annexed drawings, making a part of this specification, which is a perspective view of the apparatus I prefer to employ.

My invention is an improvement in desiccators for effecting the concentration and drying of alimentary substances for preservation, as articles of food, without producing any chemical alteration in the nature of said substance.

In evaporating the water by heat from milk, meats, vegetables, &c., to effect their concentration, without at the same time cooking the same, it is well known that the temperatures must be kept comparatively low. From this it follows that the process becomes slow, tedious, and expensive. In fact, it is difficult to prevent acetous fermentation from beginning whenever the temperature is kept so low as to be certain not to cook the articles. By my improvement I am enabled to overcome this difficulty, and at the same time increase the rate of drying in proportion to the high degree of temperature which I can maintain with safety.

My improvement consists in employing, in connection with the application of heat, such a system of agitation as will effect the almost instantaneous discharge from the liquid of the vesicle of steam formed at the bottom and sides of the desiccator as well as away from the vessel itself. I can thus effect the degree of concentration requisite to carry even the most perishable article readily past the danger of acetous fermentation in any state of the atmosphere and open to its influence. The principle lies, chiefly, in the employment of an agitator, which acts also as a pan or blower in connection with the means for graduating the velocities and blast to the varying temperatures.

In the figure, at A is shown a closed vessel or tank of suitable dimensions. Fitting tightly in on the top is sunk a broad and somewhat shallow vessel or pan, as seen at B.

At C D are two pipes entering A. The first of these is for the introduction of steam, and the latter for the blow off of the same. Over the pan B is a frame-work, which carries the fan-agitator shown at E, and which is held in the frame by a vertical spindle, as shown. The bottom of the fan is a little above the bottom of the vessel in which it revolves. Its ends also taper a little inward, in order to prevent the swash of the matter over the rim of B when the speed is high. The agitator is driven from a suitable gearing, as shown, by a tapering drum, F, the belt of which leads to another taper-drum, whereby from one unvarying rate of revolution of the driving-shaft different velocities may be obtained by shifting the belt along said drums in a manner well known. Finally, the pan is inclosed by a cover, G, one portion of which is removable, and is represented as so taken off. From the apex of the cone there is a flue, H, to carry off the vapor.

In operation the fluid intended to be concentrated or desiccated is poured into B until it is up even, or nearly so, with the top of the agitator-blade. If it be milk to be treated, proceed as follows: Let on steam through C into the tank A, and partly open a cock or take the plug out of D, to allow the steam to blow through. Run the belt up to the largest part of the drum F, to produce a slow revolution of the pan-agitator E. Watch the milk as its temperature increases, and when vapor begins to rise on its surface increase the speed gradually of the agitator. This brings the bubbles up with the greatest rapidity, but it is of the highest importance that the vapor be also driven from the surface as quickly as possible, and this is accomplished by that portion of the agitator-blade which is above the surface acting as a blower and producing a strong upward current, thereby driving off the vapors. As the temperature still increases and the vapor begins to come up in volume, the speed of E must be increased accordingly. The milk now rises by its centrifugal force up the side of the pan, while the center is equally depressed, thus making the stratum thinner as well as enlarging the area of the top of the fluid. The fan-agitator now throws off the rising vapor with considerable blast, and as the rate of concentration then attains a maximum, the mass soon assumes a pasty consistence, or becomes completely desiccated if the operation be prolonged, the process being complete when either the former or latter condition of the product is desired. The steam is then cut off, and the speed of the agitator is gradually reduced as the mass cools. The upper part of the sides of the pan should not have the steam in contact, since those parts of the contents which may chance to be dashed upon said sides at the commencement of the process will become burned and injure the flavor of the remainder. For this purpose the steam-box does not extend to the full height interiorly as at the outer side where the rim of the pan rests upon it. The same effect would be produced by extending the rim above the top of the box.

I have illustrated the operation of my said improvement by describing its use in treating milk; but it is equally applicable to a variety of other materials when rapid evaporation is desirable, as in the case of sugar-boiling.

By the means above described the crystallization of saccharine juice can be effected in the most rapid manner without boiling, resulting, of course, in an increased value to the product as well in quality as quantity.

I claim as my improvement—

In desiccating and concentrating vessels, the agitator so constructed as to be capable of acting as a blower as well as a stirrer, substantially as set forth herein.

In testimony whereof I have hereunto subscribed my name.

CHARLES ALDEN.

Witnesses:
J. P. PIRSSON,
S. H. MAYNARD.